2 Sheets—Sheet 2.

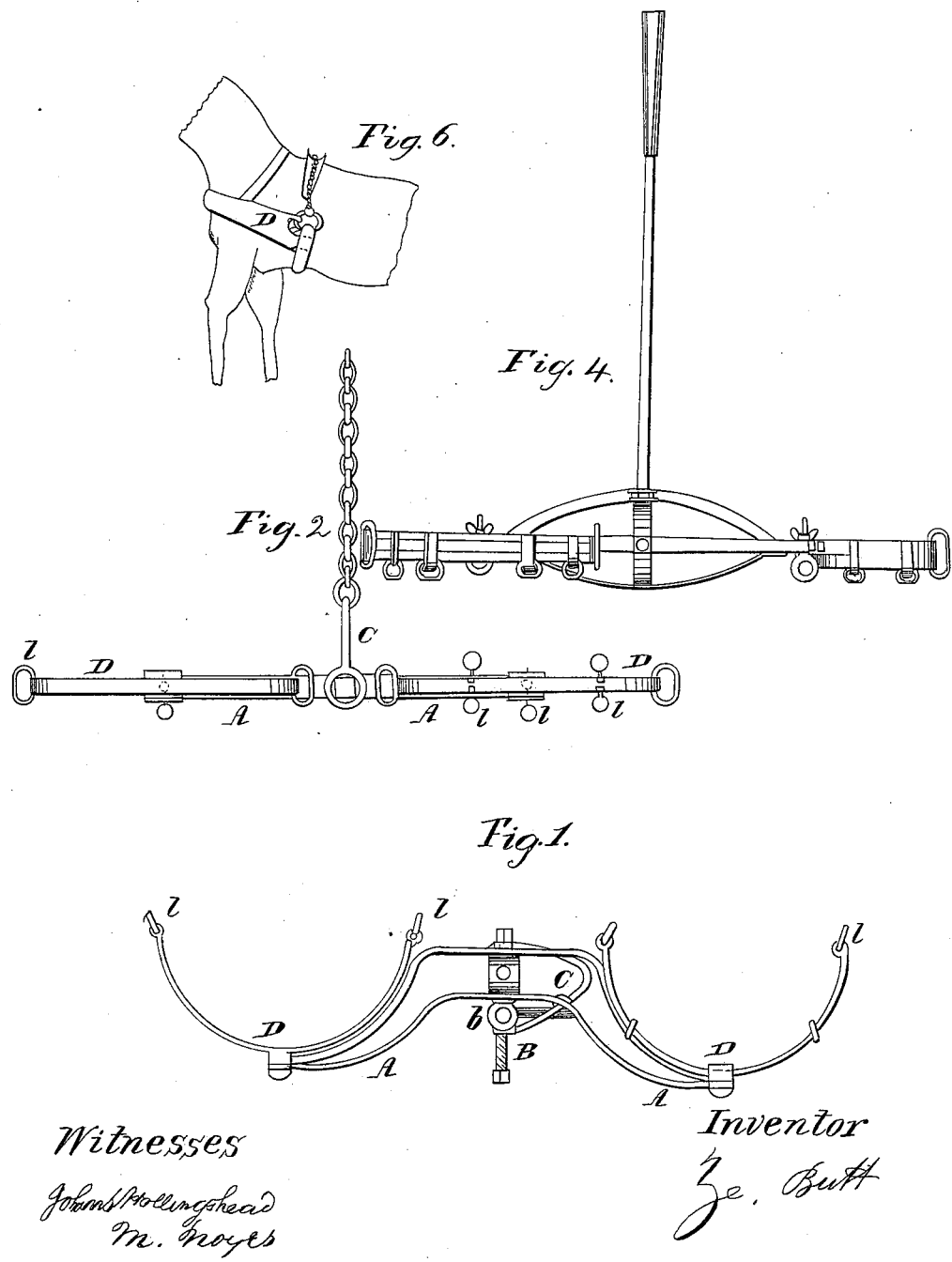

Z. BUTT.
Yoke for Horses.

No. 26,252. Patented Nov. 29, 1859.

Witnesses
John S. Hollingshead
M. Noyes

Inventor
Ze Butt

UNITED STATES PATENT OFFICE.

ZE. BUTT, OF LINCOLNTON, NORTH CAROLINA.

HARNESS-YOKE.

Specification of Letters Patent No. 26,252, dated November 29, 1859.

*To all whom it may concern:*

Be it known that I, ZE. BUTT, of the town of Lincolnton, in the county of Lincoln and State of North Carolina, have invented a new and Improved Yoke for Harnessing Horses, and which was intended to be used with my two-wheeled excavator, but which can also be used for other purposes. This yoke is so arranged, that it removes in a great measure the weight of the yoke and tongue from the necks of the horses, and throws it upon the back. It is also a convenient method of hitching a span of horses to a plow &c.; and I do hereby declare the following is a full and exact description thereof, reference being had to the accompanying drawings, and to the letters of reference marked thereon.

Similar letters refer to the same parts in each figure.

To enable others skilled in the art to make and use my invention I will proceed to describe its construction, and operation.

Figure 1, is a perspective view of my invention. Fig. 2 is a view looking directly down upon the same.

Figure 5:
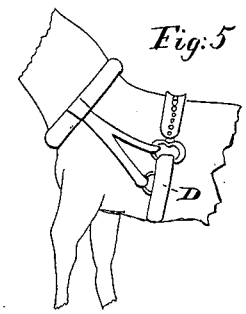

A, A, is the coupling piece, to which the bows are connected to form the yoke. The ends of this piece to which the bows are attached are made thin, and either bent, or curved so as to throw the center or connecting part of the bows forward, or below the body, or middle part of the coupling piece—which is thrown back, toward the extremities, or ends of the bows, see Fig. 1, and thus changes the center of gravity throwing it backward should the yoke be worked horizontally. And if the yoke be worked vertically, or hanging immediately beneath the saddle, or back band; as shown in Fig. 5.—As the coupling piece curves upward with the bows, and is placed close to, or around the body of the horses it is out of the way, and the horses will not strike their inner arm, or fore leg against it as they move the leg backward and forward in traveling or drawing a load.

The center of the coupling piece, or point of draft is made deep or wide either by means of the bolt and clevis, or otherwise—so as to give a wide base to the line of draft, so as to hold the yoke firm, and steady, and so that it cannot roll, tort, or twist in working.

B, is a round bolt which passes through the coupling piece perpendicularly to the line of draft. It has a round hole or opening at either end or in the center (*b*,) to receive the tongue of the cart or excavator which being there pivoted forms a universal joint, and enables the yoke to move in any required direction.

C, is a clevis held to its place by the bolts (B.) It has a wide opening or attachment, so as to hold the yoke firm and steady and to prevent torsion. To this clevis the draft rod or chain is attached.

D, D, are bows so hinged upon each end of the coupling piece that each bow moves freely and independently of the other—so as to enable the horses to travel with ease over uneven ground—and if one horse should fall, his bow would move freely to accommodate itself to his position, and not incommode the other horse. These bows can be made of iron, or wood and iron combined or any other stiff material. They can be made without joints or with joints (Fig. 2, *h*,) so as to fit the part to which applied, and can be padded or otherwise.

*l, l,* are loops or buckles to receive the straps of the harness.

Figure 6:
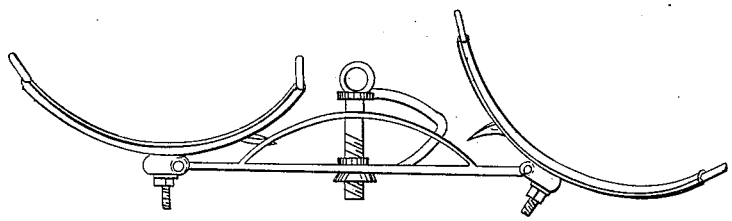

This yoke can be used with the common vertical collar, or with the breast or horizontal collar or without a collar, by simply changing the holes through which the bolt passes and throwing the line of draft in a right line with the bows. This is done by passing the bolt through the coupling piece transversely to the bows and placing the bows over the horses' breasts horizontally, as is shown in Fig. 6.

In Fig. 5, the bows are passed vertically around the horse's breast, just behind his fore legs, or immediately under the saddle, or back band, and over the girth, or belly band, and the weight is sustained by the saddles or back bands, under which the yoke is suspended and fastens the horses together. The yoke is connected to the hames or collar by straps—Fig. 5.

To hitch or harness the horses to a cart pass the end of the tongue through the round hole in the bolt and secure it there by a pin or by the draft chain, and the yoke being pivoted upon the tongue can move in every required direction.

Figure 3:
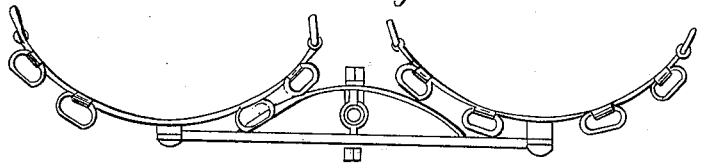

Figs. 3, 4, and 8, show different modifications of the yoke when used vertically as shown in Fig. 5.

Figure 7:
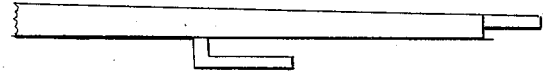

Fig. 7, is a section of the tongue of a cart or carriage showing clips to pass into the opening in the bolt, (B).

What I claim as my invention and desire to secure by Letters Patent is—

1. The manner herein described of constructing and arranging the yoke, so that its weight or the greater portion of it may rest upon the back, instead of the neck of the horses.

2. I also claim, in combination with the yoke giving a wide base to the line of draft either by the bolt and clevis, or any other equivalent device—for the purpose and in the manner herein set forth and described.

ZE. BUTT.

Witnesses:
  JOHN S. HOLLINGSHEAD,
  M. NOYES.